United States Patent [19]
Kim

[11] Patent Number: 5,585,973
[45] Date of Patent: Dec. 17, 1996

[54] MAGNETIC RECORDER AND/OR REPRODUCER OF ELIMINATING CROSSWALK INTERFERENCE IN BOTH A LONG TIME RECORD MODE AND A STANDARD RECORD MODE

[75] Inventor: Soon T. Kim, Kumi, Rep. of Korea

[73] Assignee: Samsung Electronics Co., Ltd., Kyungki-do, Rep. of Korea

[21] Appl. No.: 312,790

[22] Filed: Sep. 27, 1994

[30] Foreign Application Priority Data

Sep. 27, 1993 [KR] Rep. of Korea .................. 93-19956

[51] Int. Cl.$^6$ .............................. H04N 5/78; G11B 15/14
[52] U.S. Cl. .............................. 386/67; 360/300; 360/64; 360/66; 386/63; 386/115
[58] Field of Search ...................... 360/9.1, 10.1, 360/10.3, 64, 10.2, 66

[56] References Cited

U.S. PATENT DOCUMENTS 4,757,408  7/1988  Umeda .................. 360/64 X

*Primary Examiner*—Andrew L. Sniezek
*Attorney, Agent, or Firm*—Sughrue, Mion, Zinn, Macpeak & Seas

[57] ABSTRACT

A magnetic recorder and/or reproducer is provided for preventing a crosstalk phenomenon from occurring between adjacent tracks by a "wide head" during "long time" record mode. The magnetic recorder and/or reproducer includes a rotation drum which has a pair of first heads for recording and/or reproducing during a standard record mode and a pair of second heads for recording and/or reproducing during a long time record mode. The rotation drum also has a pair of flying erase heads whose head width is greater than or equal to the standard record track width of a standard record mode. The pair of flying erase heads is separated from the bottom surfaces of the pair of first heads by a first offset and is separated from the bottom surfaces of the pair of second heads by a second offset. Furthermore, one of the flying erase heads forms a predetermined angle with one of the first heads. Also, the pair of second heads has a head width which is wider than the long time record track width, and the recording time of the long time record mode is longer than that of the standard record mode by a predetermined number of times. With this configuration, the magnetic recorder and/or reproducer is able to remove the crosstalk during the long time record mode.

18 Claims, 7 Drawing Sheets

MAGNETIC RECORDER AND/OR REPRODUCER OF ELIMINATING CROSSWALK INTERFERENCE IN BOTH A LONG TIME RECORD MODE AND A STANDARD RECORD MODE

BACKGROUND OF THE INVENTION

The present invention relates to a magnetic recorder and/or reproducer having a standard record mode and a "long time" record mode. More particularly, the present invention relates to a magnetic recorder and/or reproducer for preventing crosstalk which may occur between adjacent tracks due to the use of a wide head in the long time record mode.

Generally speaking, a magnetic recorder and/or reproducer (e.g., a video cassette recorder) has a long time record mode whose record time is a predetermined multiple (two or three times) of the record time of the standard record mode. Specifically, the recording time of a long play (LP) mode is twice that of the standard record mode, and the recording time of a super long play (SLP) mode is three times as long as the record time of the standard record mode. A quad head (also called a "double azimuth quad head") video cassette recorder, which has the above standard and long time record modes, includes a rotation drum, a pair of standard record heads disposed on the rotation drum for recording and/or reproducing in the standard record mode, and a pair of long time record heads disposed on the rotation drum for recording and/or reproducing in the LP and SLP record modes.

The record track width for the long time record mode is narrower than the record track width for the standard record mode. Accordingly, the width of the long time record head is narrower than the width of the standard record head. In the standard record mode, the standard record head width is the same as the standard record track width. However, in the long time record mode, if the width of the long time record head is the same as the long time record track width, a tracking error can easily occur when a special reproduction operation is performed. Therefore, a long time record head whose width is greater than that of the long time record track is employed.

However, when the above-described wide head (i.e. long time record head) is utilized, portions of the signals of one track are recorded (superposed) on adjacent tracks. As a result, crosstalk occurs due to this superposed portion of the signal, and the signal-to-noise ratio decreases.

Meanwhile, U.S. Pat. No. 4,757,408 discloses a magnetic recorder and/or reproducer which comprises a flying erase head on a rotating drum in a dual-head video cassette recorder whose operation is based on track pitch and head width. The video cassette recorder has an editing function for inserting data into the existing information contained on a recorded tape. Thus, during the editing function, new data can be inserted without deleting the existing information when the video cassette recorder is operating in either the standard record mode or one of the long time record modes (LP or SLP mode).

SUMMARY OF THE INVENTION

Accordingly, it is an object of the present invention to provide a magnetic recorder and/or reproducer which employs a record head for standard recording and a wide head for long time recording and which prevents crosstalk due to the superposed portion of a signal between record tracks of a long time record mode.

To accomplish the above object, there is provided a magnetic recorder and/or reproducer in which a signal of a magnetic record medium is helically scanned by a recording and/or reproducing head disposed on a rotation drum during a recording and/or reproducing operation, the magnetic recorder and/or reproducer comprising:

a pair of first heads, wherein the first heads record and/or reproduce the signal during a standard record and/or reproduction mode and are disposed diametrically opposite to each other on the rotation drum so as to form a first angle of 180°;

a pair of second heads, wherein the second heads record and/or reproduce the signal during a long time record and/or reproduction mode and are disposed on the rotation drum and have a second azimuth which is opposite to a first azimuth of the pair of first heads, wherein the second heads have a width which is a predetermined number of times wider than a long time record track width of the long time record and/or reproduction mode, and wherein a long recording time of the long time record and/or reproduction mode is a predetermined number of times longer than a standard recording time of the standard record and/or reproduction mode; and a pair of flying erase heads, wherein the flying erase heads are disposed on the rotation drum so as to form a second angle of 180° with each other and form a predetermined angle with one of the first heads, wherein the flying erase heads are respectively separated from bottom surfaces of the first heads and the second heads by a first offset and a second offset, and wherein the flying erase heads have a width greater than or equal to a standard record track width of the standard record and/or reproduction mode.

BRIEF DESCRIPTION OF THE DRAWINGS

The above objects and advantages of the present invention will become more apparent by describing a preferred embodiment of the present invention in detail with reference to the attached drawings in which.

DETAILED DESCRIPTION OF THE INVENTION

The present invention will be explained in more detail with reference to the attached drawings.

Figure 1A:
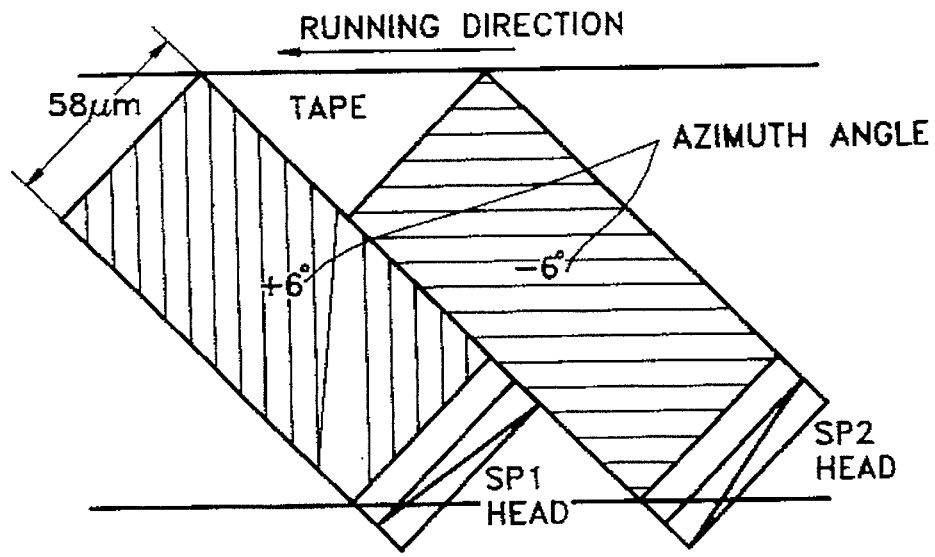
FIG. 1A illustrates tape patterns in a standard record mode according to a conventional method.

FIG. 1A is an illustration of a tape pattern created during a standard record mode of a conventional recorder and/or reproducer. In the standard record mode, an SP1 head has an azimuth of 6° to the left and an SP2 head has an azimuth of 6° to the right. The SP1 head and SP2 head have opposite azimuths so that the scanning traces of the SP1 head and SP2 head do not overlap during the standard record mode. Therefore, crosstalk between the adjacent tracks occurs less frequently, and consequently, the signal-to-noise ratio is reduced less frequently.

Figure 1B:
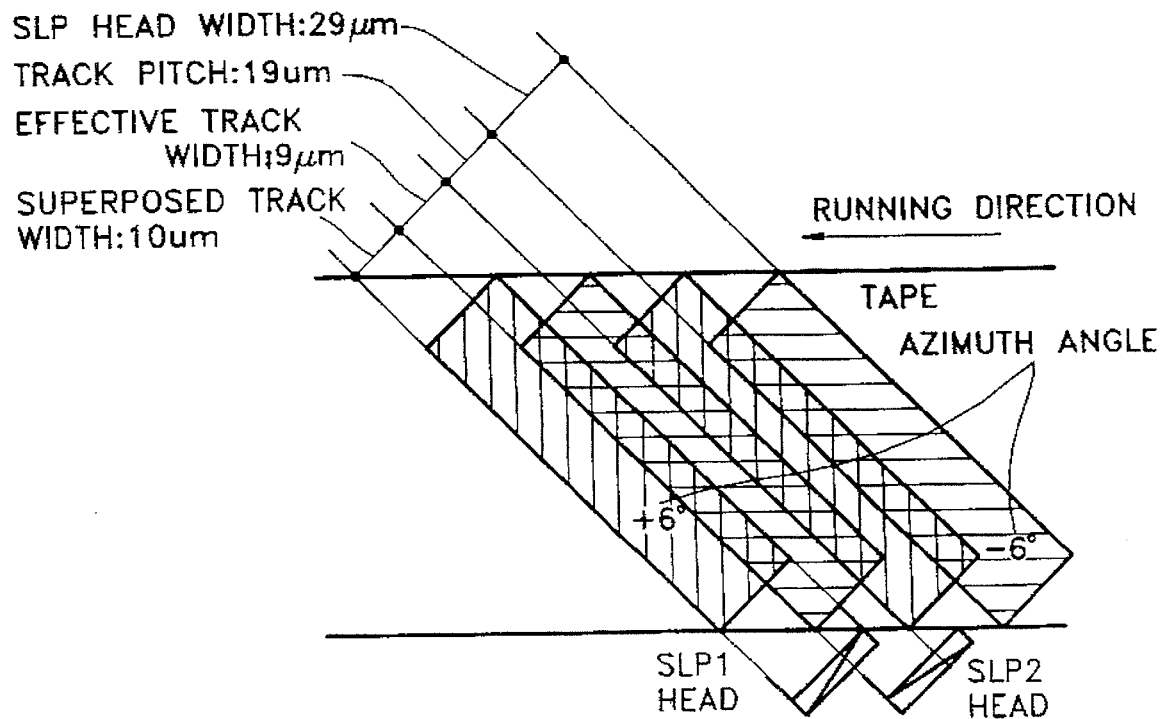
FIG. 1B illustrates tape patterns in a treble record mode according to the conventional method.

FIG. 1B shows the tape patterns created by a long time record head during the recording and/or reproducing operation in the treble record mode. In the treble record mode, the effective track width is 9 μm, while a superposed track width generated by the crosstalk of an adjacent track is 10 μm. Thus, during the conventional treble record mode, the following problems may occur:

1) The image quality may be significantly reduced;
2) The reproduced image may be easily affected by tape defects (e.g., drop-out);
3) The effect of a drum and a capstan servo system may be increased;
4) Conditions for maintaining compatibility may become more difficult to satisfy; and
5) Limitations with respect to a time base correction circuit are increased.

The main reason for the above problems is that the signal-to-noise ratio is reduced during the recording and/or reproduction in the treble record mode because the long time record track width is narrow. In addition, since the long time record head is wider than the long time record track width, the long time record head creates crosstalk between adjacent tracks.

The problem caused by the narrow record track width can be solved by a high-performance tape. However, the crosstalk problem created by the long time record head can only partially be solved by employing a just head whose width is the same as the long time record track of the treble record mode. Furthermore, when a just head is used, the compatibility is poor and problems occur when special reproduction functions are performed. For example, when a just head is used, a noise bar may be generated across the screen, and thus, a normal screen cannot be displayed.

In general, a standard record head whose width is the same as the width of the standard record track (e.g. 58 μm) is used during the standard record mode. A long time record head whose width is 26 μm to 30 μm is used during the treble record mode. However, the width of the long time record head is wider than the width of the long time record track (e.g. 19 μm). Also, a treble record head is commonly used without employing an additional LP head during a double record mode (LP mode) for recording and/or reproducing.

The following problems may result from using the above-described long time record head.

First, as shown in FIG. 1B, color flicker noise may be generated on the screen during reproduction. Color flicker is caused by the remaining component of a low-pass filtered chrominance signal of the deep layer of the superposed portion that is generated in every record track.

Figure 2:
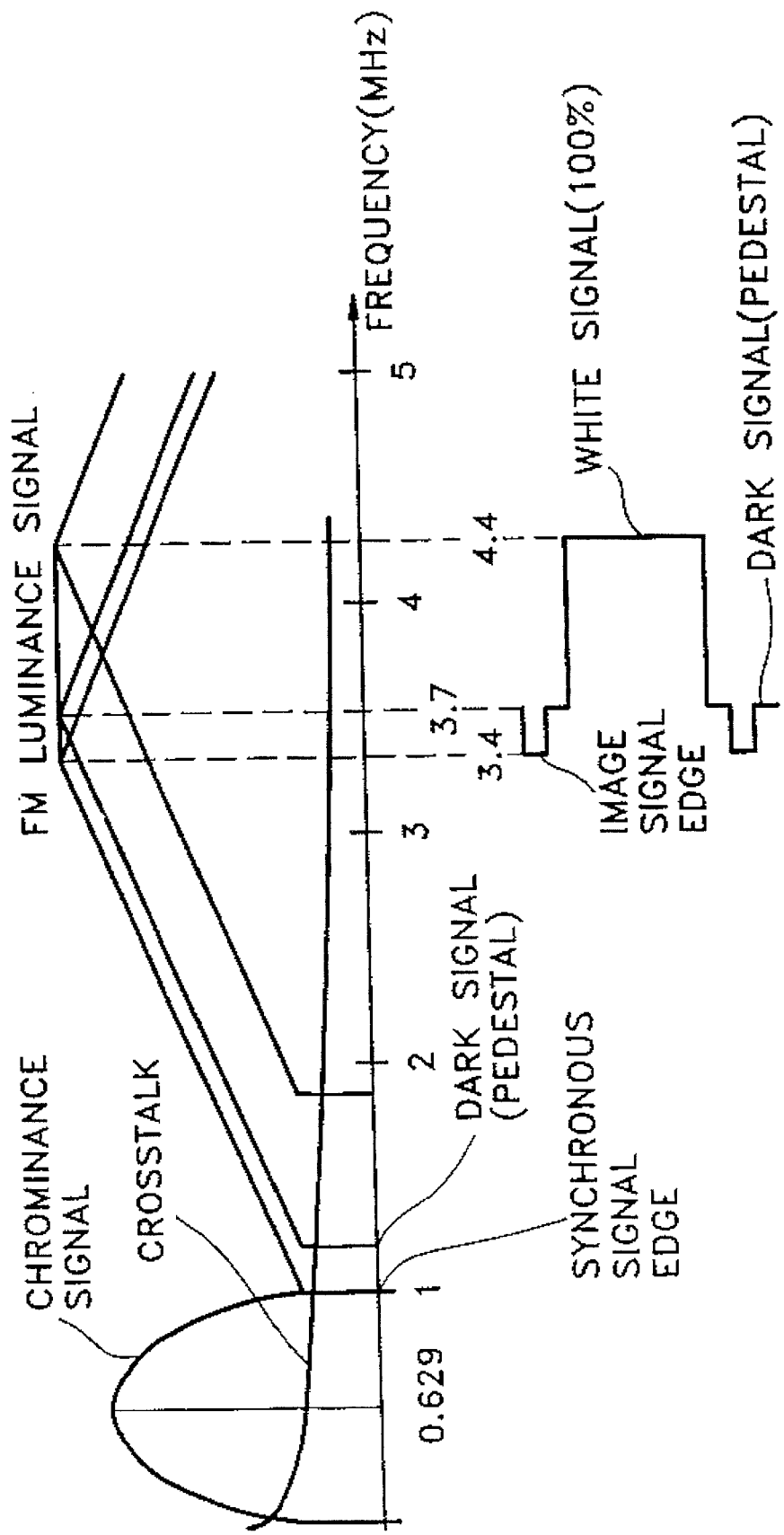
FIG. 2 illustrates the spectral responses of a chrominance signal and FM luminance signal and illustrates the amount of crosstalk when reproduction is performed.

Second, as shown in FIG. 2, a luminance signal component remains mixed with the filtered chrominance signal after most of the luminance and chrominance signals are separated. This luminance signal component causes crosstalk in the low frequency band portion of the luminance signal, and as a result, cross color noise is generated.

Third, as shown in FIG. 2, the low frequency band portion (synchronous signal edge) of an FM luminance signal has a weak azimuth angle effect and a significant amount of crosstalk. Furthermore, this low frequency band portion causes noise or jitter in the luminance signal. In addition, a time base correction circuit tends to malfunction when the noise or jitter is corrected by the correction circuit during reproduction.

FIG. 2 further illustrates the spectral responses of a low-pass chrominance signal and a low frequency component of an FM luminance signal during reproduction and illustrates the azimuth angle effect due to crosstalk. The crosstalk effect that is caused by the superposed portion illustrated in FIG. 1B is mainly generated from the low-pass chrominance signal and the low frequency component of the FM luminance signal.

Figure 3A:
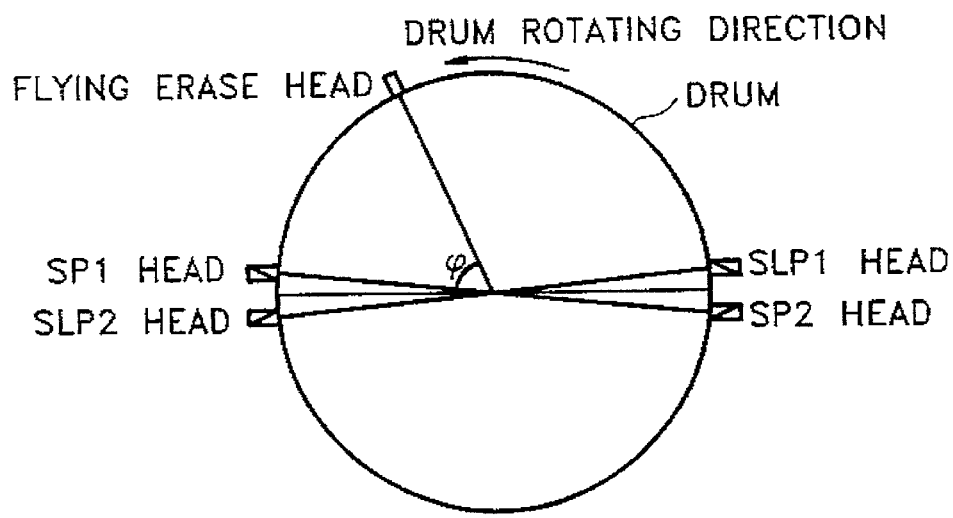
FIG. 3A is a plan view for illustrating a rotation drum and the heads disposed on the rotation drum of the conventional method.
Figure 3B:
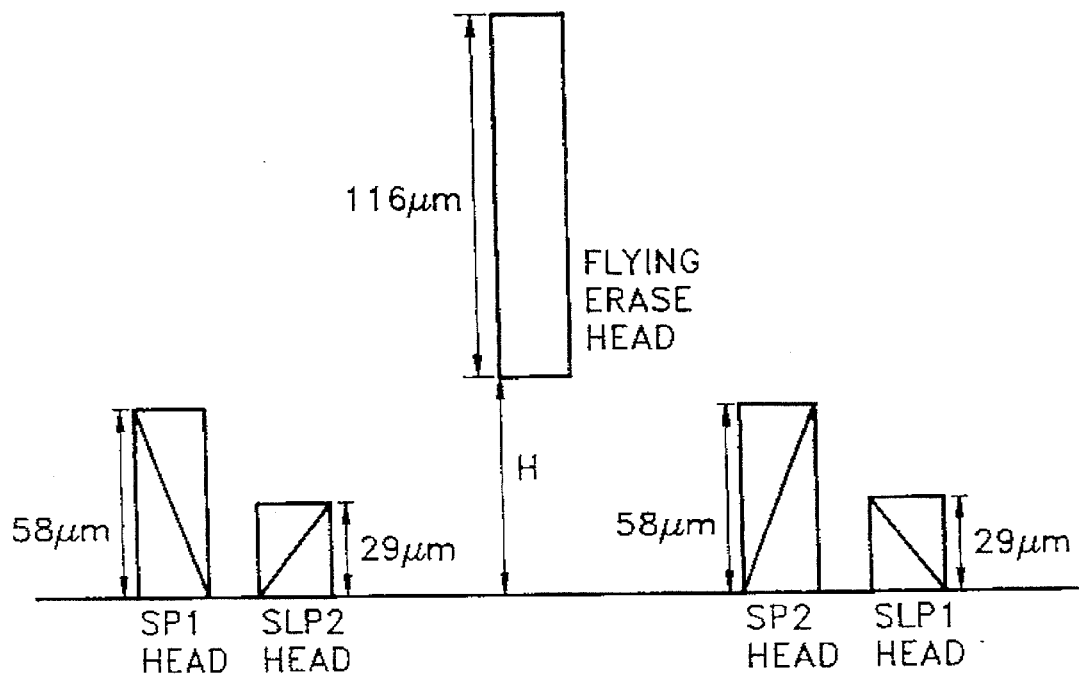
FIG. 3B is a section view for illustrating the rotation drum and the heads disposed on the rotation drum of the conventional method.

FIG. 3A and FIG. 3B show a front view and plan view of the double azimuth quad head and the flying erase head disposed on a rotation drum of the conventional recorder and/or reproducer. The quad head includes standard record heads SP1 and SP2 for standard recording and long time record heads SLP1 and SLP2 for long time recording. The bottom of all four rotation record heads SP1, SP2, SLP1, and SLP2 are arranged at the same vertical position of the rotation drum as shown in FIG. 3B. The bottom of the flying erase head is offset by a predetermined vertical separation distance H (offset H) from the bottom surfaces of rotation record heads SP1, SP2, SLP1, and SLP2. In addition, the flying erase head has a width of 116 μm which is twice the width (58 μm) of the standard record heads SP1 and SP2.

Figure 4A:
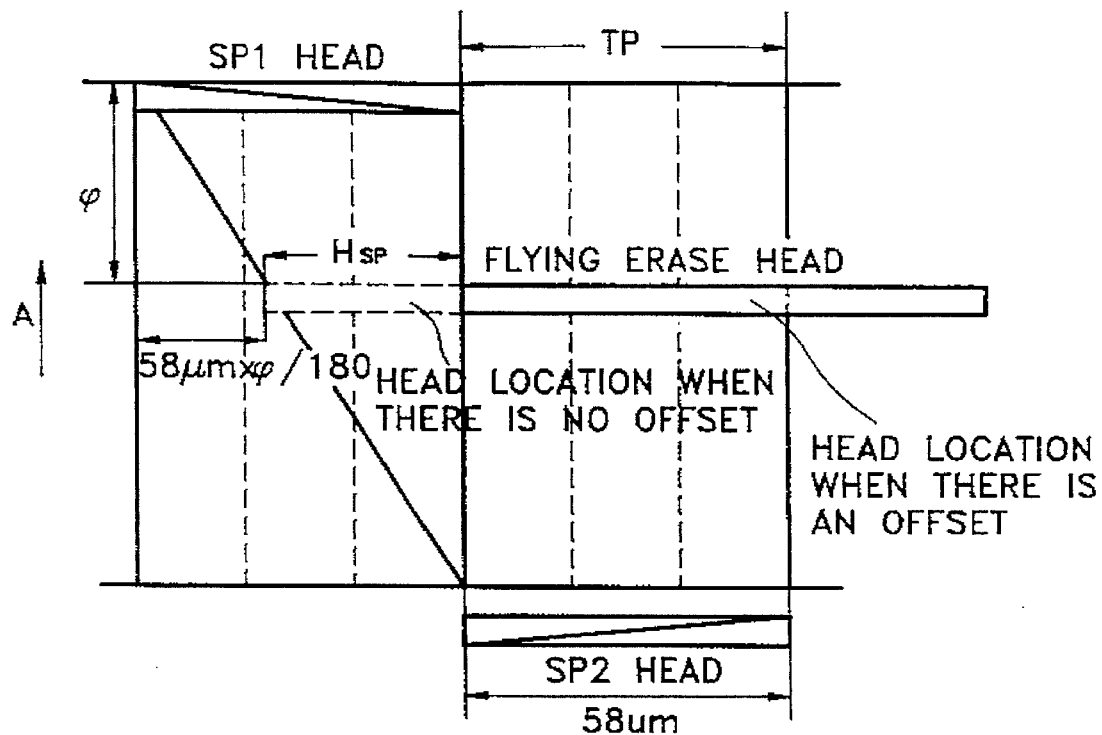
FIG. 4A is a tape pattern view showing the recording operations in a standard record mode when the flying erase heads of FIG. 3A and FIG. 3B are suitably disposed for a standard record mode.
Figure 4B:
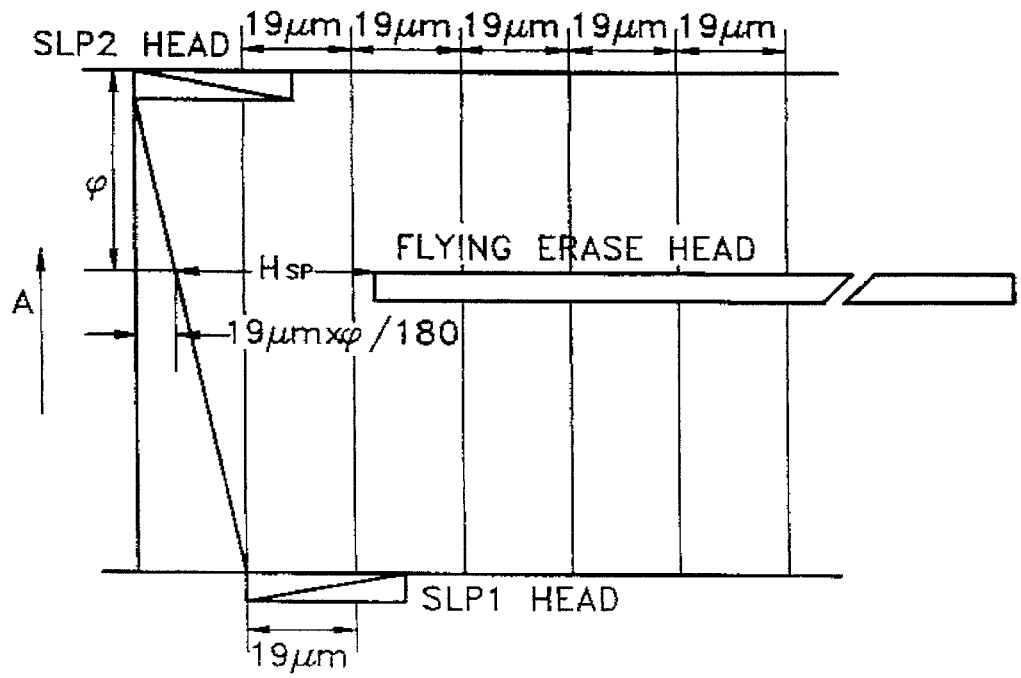
FIG. 4B is a tape pattern view showing the recording operations in a treble record mode when the flying erase heads of FIG. 3A and FIG. 3B are suitably disposed for a standard record mode.

FIG. 4A illustrates the record and erase operation of the standard record heads SP1 and SP2 and the flying erase head during the standard record mode. FIG. 4B illustrates record and erase operation of the long time record heads SLP1 and SLP2 and the flying erase head during the treble record mode. In FIG. 4A and FIG. 4B, an arrow "A" denotes the direction of movement of the heads with respect to the tape.

During the standard record mode, the bottom surface of the flying erase head is separated from the bottom surfaces of the standard record heads SP1 and SP2 by a first offset HsP. Consequently, the flying erase head will not erase the track recorded by the standard record heads SP1 and SP2. In the standard record mode, the first offset HsP can be expressed as follows $$H_{SP} = nTP_{SP} - \frac{\phi TP_{SP}}{180} \quad (1)$$

wherein $TP_{SP}$ is the standard record track width of the standard record mode, $\phi$ is the angle between the standard record head SP1 and the flying erase head, and n is a positive integer.

When the condition of expression (1) is satisfied, the flying erase head does not erase the track recorded by the standard record heads SP1 and SP2 during the standard record mode. However, during the treble record mode, crosstalk is generated between adjacent tracks, as shown in FIG. 4B.

Figure 5A:
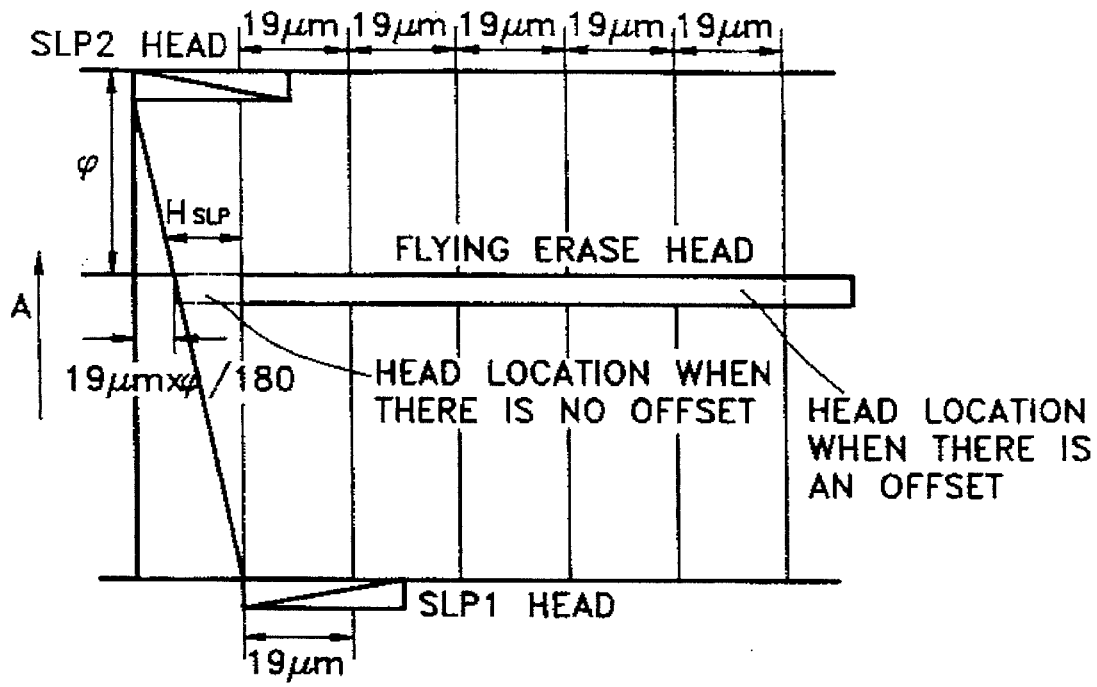
FIG. 5A is a tape pattern view showing the recording operations in a standard record mode when the flying erase heads of FIG. 3A and FIG. 3B are suitably disposed for a treble record mode.

In addition, as shown in FIG. 5A, the flying erase head can be arranged so that the bottom surface of the flying erase head is separated from bottom surfaces of the long time record heads SLP1 and SLP2 by a second offset HSLP. As a result, a track recorded by the long time record heads SLP1 and SLP2 can not be erased by a flying erase head during the treble record mode. The second offset HSLP can be expressed as follows $$H_{SLP} = nTP_{SLP} - \frac{\phi TP_{SLP}}{180} \quad (2)$$

wherein $TP_{SLP}$ is the long time record track width of the treble record mode, $\phi$ is the angle between the standard record head SP1 and the flying erase head, and n is a positive integer. If n=1, the recording can be performed without creating the superposed portion on adjacent tracks. If n=2, the recording can be performed without creating the superposed portion. However, if n=2, the superposed portion is only prevented from forming on one track, and therefore, n should ideally equal one.

Figure 5B:
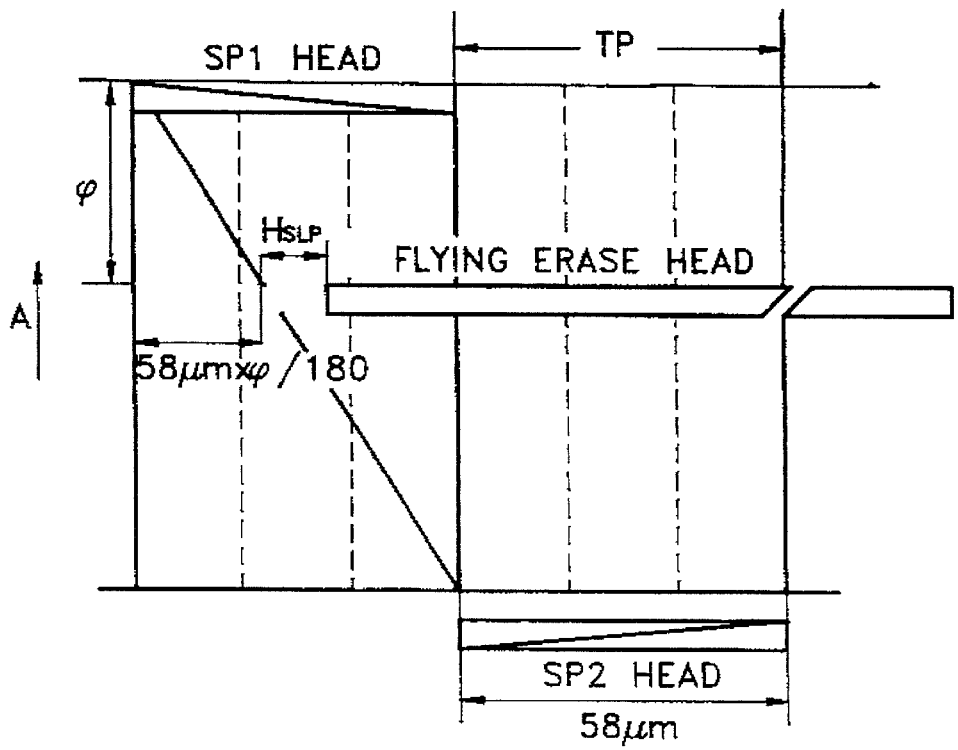
FIG. 5B is a tape pattern views showing the recording operations in a treble record mode when the flying erase heads of FIG. 3A and FIG. 3B are suitably disposed for a treble record mode.

If the condition of expression (2) is satisfied, a flying erase head does not erase the track recorded by the long time record heads SLP1 and SLP2 during a treble record mode as shown in FIG. 5A. However, during the standard record mode, the flying erase head erases part of the track recorded by standard record heads SP1 and SP2 as shown in FIG. 5B. Consequently, recorded information is unavoidably lost.

Figure 6A:
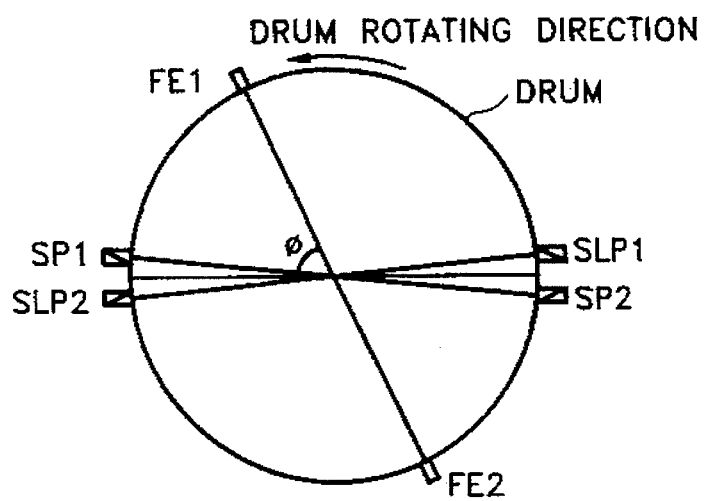
FIG. 6A is a plan view for illustrating a rotation drum and the heads disposed on the rotation drum according to the present invention.
Figure 6B:
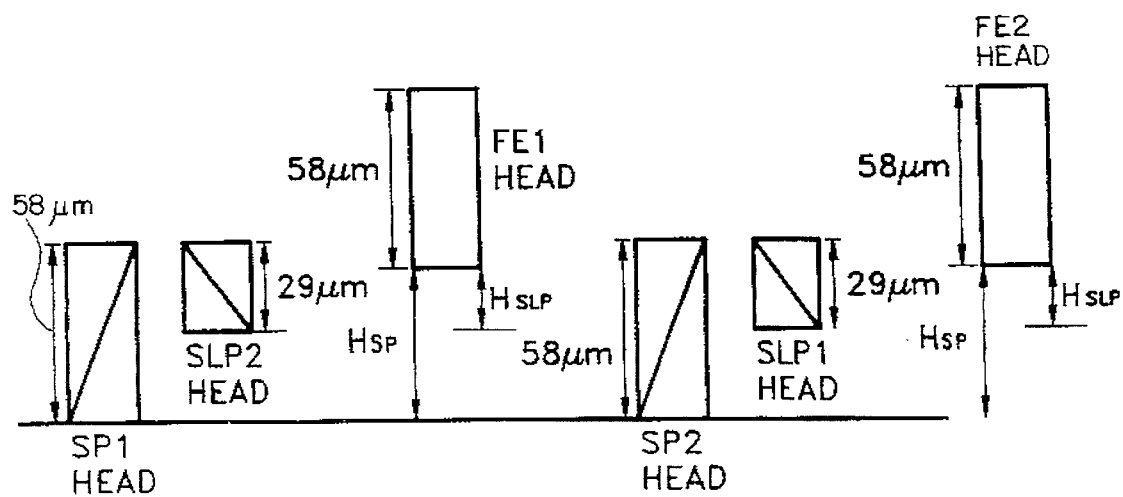
FIG. 6B is a section view for illustrating the rotation drum and the heads disposed on the rotation drum according to the present invention.

FIG. 6A and FIG. 6B are a plan view and front view, respectively, of a double azimuth quad head and a pair of flying erase heads FE1 and FE2 disposed on a rotation drum according to an embodiment of the present invention. The quad head includes standard record heads SP1 and SP2 for standard recording and long time record heads SLP1 and SLP2 for long time recording. The flying erase head FE1 and the standard record head SP1 form an angle of $\phi°$ as shown in FIG. 6A. The other flying erase head FE2 is arranged diametrically opposite to the flying erase head FE1 and forms an angle of 180° with the flying erase head FE1.

As shown in FIG. 6B, the bottom surfaces of the standard record heads SP1 and SP2 are located at a certain position on the drum while the bottom surfaces of the long time record heads SLP1 and SLP2 are separated from the bottom surface of the standard record heads SP1 and SP2 by a predetermined distance. Also, the bottom surfaces of flying erase heads FE1 and FE2 are separated from the bottom surfaces of the standard record heads SP1 and SP2 by a first offset $H_{SP}$ and are separated from the bottom surfaces of the long time record heads SLP1 and SLP2 by a second offset $H_{SLP}$. In addition, the widths of the flying erase heads FE1 and FE2 (58 μm) are the same as the widths of the standard recording heads SP1 and SP2. It should be noted that there is no second offset between the bottom surfaces of the long time record heads and the bottom surfaces of the flying erase head of the prior art.

Figure 7A:
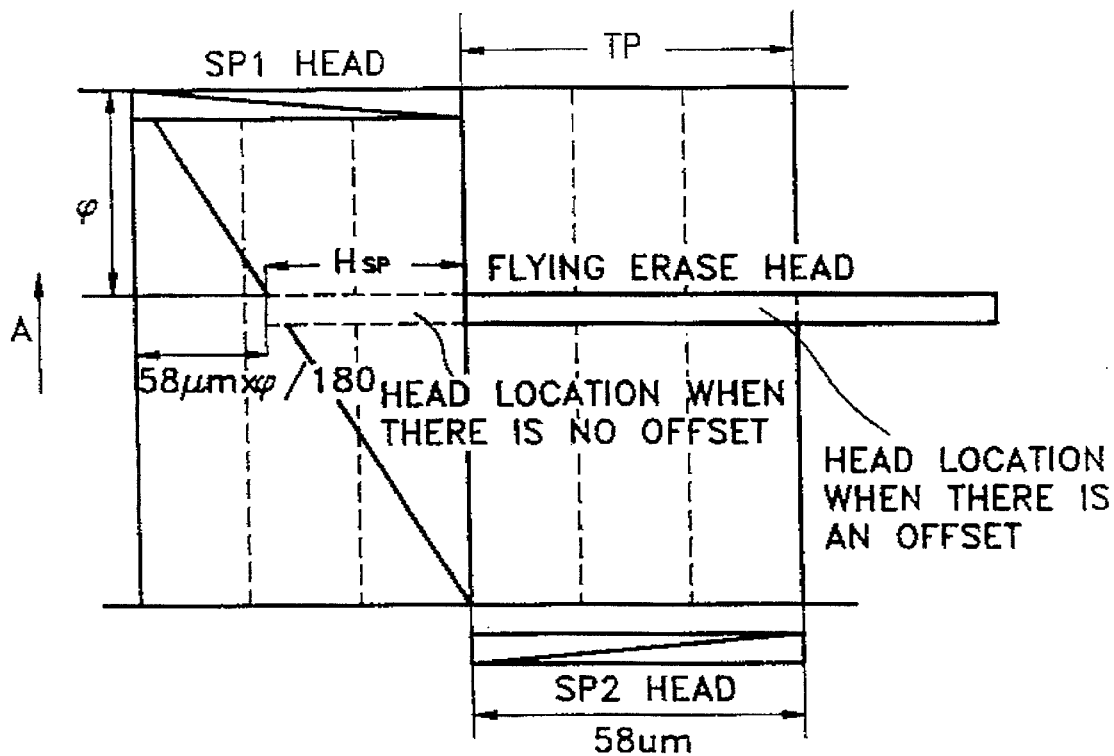
FIG. 7A is a tape pattern view showing the recording operation in a standard record mode performed by the heads disposed on the rotation drum shown in FIG. 6A and FIG. 6B.

FIG. 7A illustrates a standard recording operation of the standard record heads SP1 and SP2 that are disposed on the rotation drum shown in FIG. 6A and FIG. 6B. To prevent the track recorded by the standard record heads SP1 and SP2 from being erased by the flying erase heads FE1 and FE2, the bottom surfaces of the flying erase heads FE1 and FE2 are separated from the bottom surfaces of the standard record heads SP1 and SP2 by a first offset $H_{SP}$. As a result, expression (1) is satisfied. Similarly, to prevent the track recorded by the long time record heads SLP1 and SLP2 from being eraser by the flying erase heads FE1 and FE2 during the long time record mode, the bottom surfaces of the flying erase heads FE1 and FE2 are separated from the bottom surfaces of the long time record heads SLP1 and SLP2 by a second offset $H_{SLP}$. Consequently, expression (2) is also satisfied.

Figure 7B:
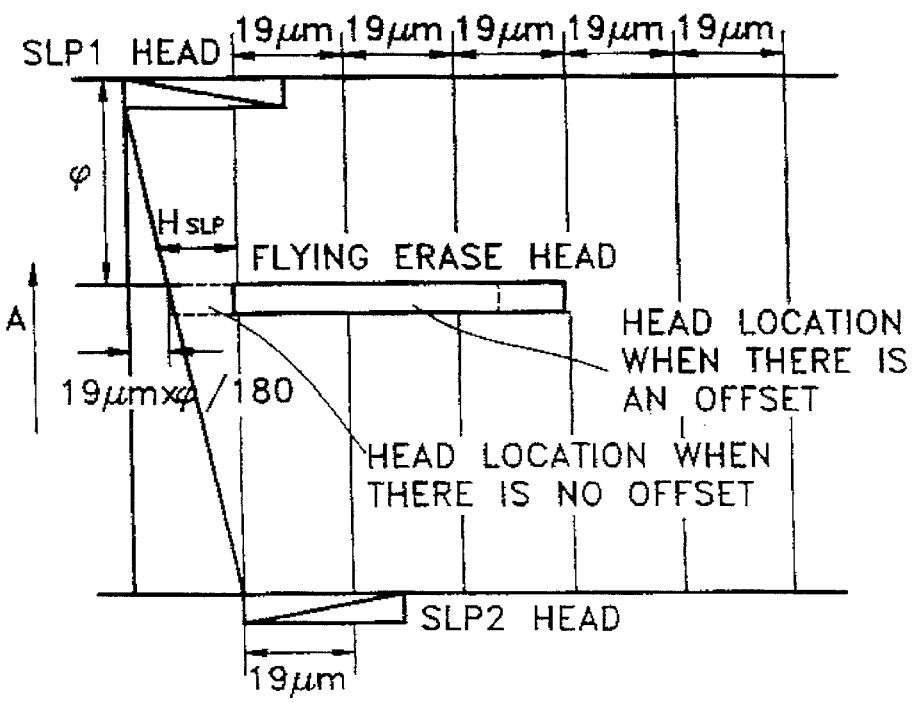
FIG. 7B is a tape pattern view showing the recording operation in a treble record mode performed by the heads disposed on the rotation drum shown in FIG. 6A and FIG. 6B.

When record heads SP1, SP2, SLP1, and SLP2 and the flying erase heads FE1 and FE2 are arranged to satisfy expressions (1) and (2), the long time record heads SLP1 and SLP2 are able to record a signal onto a tape during the long time record mode without crosstalk. As shown in FIG. 7B, the long time record head SLP1 records a video signal onto a tape. Then, the flying erase head FE1 erases the recorded portion of the signal which is superposed on the adjacent track, and the long time record head SLP2 records a video signal onto the adjacent track of the tape. Then, the flying erase head FE2 erases the recorded portion of the signal track which is superposed onto the next adjacent track by the long time record head SLP2.

The present invention can be applied to a video cassette recorder, audio cassette recorder, digital audio tape recorder, and particularly to a video cassette recorder that performs deep recording. In addition, while the long time record mode of the embodiment of the present invention has been described with reference to a treble record mode (SLP mode), an LP mode may also be used as a long time record mode.

A magnetic recorder and/or reproducer of the present invention can record and reproduce a signal without degrading the image quality of the signal. Furthermore, a portion of the signal recorded in superposition onto an adjacent track by a long time head during the long time record mode can be erased by a flying erase head that is disposed at a predetermined location of the rotation drum. As a result, crosstalk which would otherwise be generated between adjacent tracks can be prevented during the long time record mode.

In addition, the previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope consistent with the principles and novel features disclosed herein.

What is claimed is:

1. A magnetic recorder and/or reproducer in which a signal of a magnetic record medium is helically scanned by a recording and/or reproducing head disposed on a rotation drum during a recording and/or reproducing operation, said magnetic recorder and/or reproducer comprising:

a pair of first heads, wherein said first heads record and/or reproduce said signal during a standard record and/or reproduction mode and are disposed diametrically opposite to each other on said rotation drum so as to form an angle of 180°;

a pair of second heads, wherein said heads record and/or reproduce said signal during a long time record and/or reproduction mode and are disposed on said rotation drum and have a second azimuth which is opposite to a first azimuth of said pair of first heads, wherein said second heads have a width which is a predetermined number of times wider than a long time record track width of said long time record and/or reproduction mode, and wherein a long recording time of said long time record and/or reproduction mode is a predetermined number of times longer than a standard recording time of said standard record and/or reproduction mode; and a pair of flying erase heads, wherein said flying erase heads are disposed on said rotation drum so as to form an angle of 180° with each other and so as to form a predetermined angle with one of said first heads, wherein said flying erase heads are respectively separated from bottom surfaces of said first heads and said second heads by a first offset and a second offset, wherein said flying erase heads have a width greater than or equal to a standard record track width of said standard record and/or reproduction mode, and wherein said first offset and said second offset are different.

2. The magnetic recorder and/or reproducer according to claim 1, wherein said first offset ($H_{SP}$) and said second offset ($H_{SLP}$) are respectively defined as $$H_{SP} = nTP_{SP} - \frac{\phi TP_{SP}}{180}$$

$$H_{SLP} = nTP_{SLP} - \frac{\phi TP_{SLP}}{180}$$

wherein n is a positive integer, $TP_{SP}$ is said standard record track width, $TP_{SLP}$ is said long time record track width, and $\phi$ is said predetermined angle.

3. The magnetic recorder and/or reproducer according to claim 1, wherein said long time record and/or reproduction mode is a super long play mode during which said long recording time is three times as long as said standard recording time.

4. The magnetic recorder and/or reproducer according to claim 1, wherein said long time record and/or reproduction mode is a long play mode during which said long recording time is twice as long as said standard recording time.

5. The magnetic recorder and/or reproducer according to claim 1, wherein said width of said flying erase heads equals said standard record track width.

6. The magnetic recorder and/or reproducer according to claim 1, wherein said bottom surfaces of said first heads are separated from said bottom surfaces of said second heads by a predetermined distance.

7. A magnetic recorder and/or reproducer having a rotation drum on which a double azimuth quad head is disposed, said magnetic recorder and/or reproducer comprising:

a pair of standard recording and/or reproducing heads disposed on said rotation drum, wherein said pair of standard recording and/or reproducing heads are part of said double azimuth quad head and are used during a standard record and/or reproduction mode;

a pair of long time recording and/or reproducing heads disposed on said rotation drum, wherein said pair of long time recording and/or reproducing heads are part of said double azimuth quad head and are used during a long time record and/or reproduction mode;

a pair of flying erase heads disposed on said rotation drum so as to form a predetermined angle with respect to one of said standard recording and/or reproducing heads, wherein bottom surfaces of said flying erase heads are separated from bottom surfaces of said standard recording and/or reproducing heads by a first offset and are separated from bottom surfaces of said pair of long time recording and/or reproducing heads by a second offset, wherein said flying erase heads have a width greater than or equal to a standard record track width of said standard record and/or reproduction model and wherein said first offset and said second offset are different.

8. The magnetic recorder and/or reproducer according to claim 7, wherein said first offset ($H_{SP}$) and said second offset ($H_{SLP}$) are respectively defined as $$H_{SP} = nTP_{SP} - \frac{\phi TP_{SP}}{180}$$

$$H_{SLP} = nTP_{SLP} - \frac{\phi TP_{SLP}}{180}$$

wherein n is a positive integer, $TP_{SP}$ is said standard record track width, $TP_{SLP}$ is a long time record track width of said long time record and/or reproduction mode, and $\phi$ is said predetermined angle.

9. The magnetic recorder and/or reproducer according to claim 7, wherein said long time record and/or reproduction mode is a super long play mode during which a recording time of said super long play mode is three times as long as a recording time of said standard record and/or reproduction mode.

10. The magnetic recorder and/or reproducer according to claim 7, wherein said long time record and/or reproduction mode is a long play mode during which a recording time of said long play mode is twice as long as a recording time of said standard record and/or reproduction mode.

11. The magnetic recorder and/or reproducer according to claim 7, wherein said width of said flying erase heads equals said standard record track width.

12. The magnetic recorder and/or reproducer according to claim 7, wherein said bottom surfaces of said long time recording and/or reproducing heads are separated from said bottom surfaces of said standard recording and/or reproducing heads by a predetermined distance.

13. A magnetic recorder and/or reproducer in which signals of a magnetic record medium are helically scanned by a recording and/or reproducing head disposed on a rotation drum during a recording and/or reproducing operation, said magnetic recorder and/or reproducer comprising:

a pair of first heads, wherein said first heads record and/or reproduce a first signal during a standard record and/or reproduction mode and are disposed diametrically opposite to each other on said rotation drum so as to form an angle of 180°;

a pair of second heads, wherein said second heads record and/or reproduce a second signal during a long time record and/or reproduction mode and are disposed on said rotation drum, wherein said second heads have a width which is wider than a long time record track width of said long time record and/or reproduction mode, and wherein a long recording time of said long time record and/or reproduction mode is a predetermined number of times longer than a standard recording time of said standard record and/or reproduction mode; and a pair of flying erase heads, wherein said flying erase heads are disposed on said rotation drum so as to form an angle of 180° with each other and so as to respectively form a predetermined angle with said first heads, wherein said flying erase heads are respectively separated from bottom surfaces of said first heads and said second heads by a first offset and a second offset, wherein said flying erase heads have a width greater than or equal to a standard record track width of said standard record and/or reproduction mode, and wherein said first offset and said second offset are different.

14. The magnetic recorder and/or reproducer according to claim 13, wherein said first offset ($H_{SP}$) and said second offset ($H_{SLP}$) are respectively defined as $$H_{SP} = nTP_{SP} - \frac{\phi TP_{SP}}{180}$$

$$H_{SLP} = nTP_{SLP} - \frac{\phi TP_{SLP}}{180}$$

wherein n is a positive integer, $TP_{SP}$ is said standard record track width, $TP_{SLP}$ is said long time record track width, and $\phi$ is said predetermined angle.

15. The magnetic recorder and/or reproducer according to claim 13, wherein said long time record and/or reproduction mode is a super long play mode during which said long recording time is three times as long as said standard recording time.

16. The magnetic recorder and/or reproducer according to claim 13, wherein said long time record and/or reproduction mode is a long play mode during which said long recording time is twice as long as said, standard recording time.

17. The magnetic recorder and/or reproducer according to claim 13, wherein said width of said flying erase heads equals said standard record track width.

18. The magnetic recorder and/or reproducer according to claim 13, wherein said bottom surfaces of said first heads are separated from said bottom surfaces of said second heads by a predetermined distance.

* * * * *